United States Patent
Kim et al.

(10) Patent No.: US 9,627,007 B2
(45) Date of Patent: Apr. 18, 2017

(54) METHOD FOR DISPLAYING INFORMATION AND ELECTRONIC DEVICE THEREOF

(71) Applicant: Samsung Electronics Co., Ltd., Gyeonggi-do (KR)

(72) Inventors: Sang-Ho Kim, Gyeongsangbuk-do (KR); Eung-Ha Kim, Gyeongsangbuk-do (KR); Tai-Hyung Kim, Gyeongsangbuk-do (KR); Joo-Hyun Moon, Daegu (KR); Bong-Seok Park, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 271 days.

(21) Appl. No.: 14/467,985

(22) Filed: Aug. 25, 2014

(65) Prior Publication Data
US 2015/0058342 A1 Feb. 26, 2015

(30) Foreign Application Priority Data
Aug. 23, 2013 (KR) .......................... 10-2013-0100731

(51) Int. Cl.
G06F 17/30 (2006.01)
G11B 27/10 (2006.01)

(52) U.S. Cl.
CPC ...... *G11B 27/105* (2013.01); *G06F 17/30038* (2013.01)

(58) Field of Classification Search
CPC ......... G06F 17/30174; G06F 17/30038; G06F 17/30; G06F 3/01; G06F 3/0448;
(Continued)

(56) References Cited

U.S. PATENT DOCUMENTS 8,255,323 B1 *  8/2012  Casey ................ G06Q 20/3221
                                                              705/35
2002/0052913 A1 *  5/2002  Yamada ............ G06F 17/30867
                                                              707/E17.109
(Continued)

FOREIGN PATENT DOCUMENTS

KR     20010051724    6/2001
KR     1020070103728  10/2007

OTHER PUBLICATIONS

John Paulin Hansen et al.—"Collecting location-based voice messages on a TalkingBadge"—Proceeding NordiCHI '12 Proceedings of the 7th Nordic Conference on Human-Computer Interaction: Making Sense Through Design—Copenhagen, Denmark—Oct. 14-17, 2012—pp. 219-227.*

(Continued)

*Primary Examiner* — Anh Ly
(74) *Attorney, Agent, or Firm* — The Farrell Law Firm, P.C.

(57) ABSTRACT

A method of storing information at data and displaying the stored information and an electronic device thereof are provided. The method includes detecting occurrence of a bookmark event while recording or reproducing media data; determining a bookmark segment in the media data to correspond to the occurrence of the bookmark event; and acquiring text information corresponding to voice information of the bookmark segment.

14 Claims, 8 Drawing Sheets

(58) Field of Classification Search
CPC ............ G06F 3/0412; G06F 17/30884; G06F 17/30598; G06F 17/30175; G06F 17/30716; G06F 17/24; G06F 17/2235; G06F 3/0488; G06F 3/0482; G06F 17/30675; G10L 15/26; H04L 65/601; G11B 27/104; G11B 27/105
See application file for complete search history.

(56) References Cited

U.S. PATENT DOCUMENTS

| | | | | |
|---|---|---|---|---|
| 2003/0016943 A1* | 1/2003 | Chung | ............. | G06F 17/30884 707/E17.114 |
| 2004/0054667 A1* | 3/2004 | Kake | ........................ | G06F 3/016 707/E17.114 |
| 2007/0036522 A1* | 2/2007 | Yoshida | ............... | G11B 27/105 386/241 |
| 2007/0110397 A1* | 5/2007 | Tanikawa | ............. | G11B 27/034 386/241 |
| 2007/0250895 A1* | 10/2007 | Yamada | ................. | H04N 5/445 725/134 |
| 2008/0271077 A1* | 10/2008 | Kim | ..................... | G11B 27/005 725/39 |
| 2010/0315359 A1* | 12/2010 | Seong | ................... | G06F 15/025 345/173 |
| 2011/0077047 A1* | 3/2011 | Epp | ....................... | H04M 1/656 455/556.1 |
| 2012/0162470 A1* | 6/2012 | Kim | .................. | G06K 9/00281 348/231.2 |
| 2012/0210211 A1* | 8/2012 | Min | .................. | G06F 17/30884 715/255 |
| 2013/0066894 A1* | 3/2013 | Ishida | .................... | G06Q 50/01 707/758 |

OTHER PUBLICATIONS

David Carmel et al.—"Who tags the tags?: a framework for bookmark weighting"—Proceeding CIKM '09 Proceedings of the 18th ACM conference on Information and knowledge management—Hong Kong, China—Nov. 2-6, 2009—pp. 1577-1580.*

* cited by examiner

METHOD FOR DISPLAYING INFORMATION AND ELECTRONIC DEVICE THEREOF

PRIORITY

This application claims priority under 35 U.S.C. §119(a) to a Korean Patent Application filed in the Korean Intellectual Property Office on Aug. 23, 2013 and assigned Serial No. 10-2013-0100731, the entire content of which is incorporated herein by reference.

BACKGROUND OF THE INVENTION

1. Field of the Invention

The present invention generally relates to a method for displaying information and an electronic device thereof.

2. Description of the Related Art

Electronic devices generally use a touch screen device that can simultaneously perform an input and an output as a data input means. The touch screen device may display various information which an electronic device provides on a display screen, and when touching the displayed information, the touch screen device uses a method of processing a function of the electronic device corresponding to the touch.

SUMMARY OF THE INVENTION

The present invention has been made to solve at least the above-mentioned problems and/or disadvantages and to provide at least the advantages described below. Accordingly, an aspect of the present invention is to provide a method of selecting a reproduction segment of media data in an electronic device and the electronic device thereof.

Another aspect of the present invention is to provide additional information about a bookmark position of media data in an electronic device and a method of operating the electronic device.

Another aspect of the present invention is to provide a method of controlling information stored at media data in an electronic device and the electronic device thereof.

In accordance with an aspect of the present invention, a method of operating an electronic device is provided. The method includes detecting occurrence of a bookmark event while recording or reproducing media data; determining a bookmark segment in the media data to correspond to the occurrence of the bookmark event; and acquiring text information corresponding to voice information of the bookmark segment.

In accordance with another aspect of the present invention, an electronic device is provided, which includes a touch screen; a memory; and at least one processor. The at least one processor configured to detect occurrence of a bookmark event while recording or reproducing media data, to determine a bookmark segment in the media data to correspond to the occurrence of the bookmark event, and to acquire text information corresponding to voice information of the bookmark segment.

BRIEF DESCRIPTION OF THE DRAWINGS

The above and other aspects, features and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Embodiments of the present invention will be described herein below with reference to the accompanying drawings. In the following description, well-known functions or constructions are not described in detail since they would obscure the invention in unnecessary detail. Further, the terms used herein are defined according to the functions of the present invention. Therefore, the terms may vary depending on a user's or an operator's intension and usage. That is, the terms used herein must be understood based on the descriptions made herein.

When describing various embodiments of the present invention, an electronic device will be described based on a touch screen that can perform an input operation through an input device and a display operation through a display unit on a physical one screen. In a device configuration of the present invention, even if a display unit and an input device are separately shown, when representing the display unit, the display unit may include the input device or the input device may be represented with the display unit.

The present invention is not limited to only an electronic device including a touch screen and may be applied to various electronic devices in which a display unit and an input device are physically separated or that include only one of a display unit and an input device. Hereinafter, in various embodiments, a device having a touch screen as a display unit may be represented with an electronic device including a touch screen, and the touch screen includes a touch input device and a display unit, includes a display unit that does not include a touch input device, or includes a display unit including an input device.

In the following description, an electronic device 100 may include a mobile communication user device, a Personal Digital Assistant (PDA), a Personal Computer (PC), a laptop computer, a smart phone, a smart television, a Netbook, a Mobile Internet Device (MID), an Ultra Mobile PC (UMPC), a tablet PC, a mobile pad, a media player, a hand-held computer, a navigation device, a smart watch, a Head Mounted Display (HMD), and a Moving Picture Experts Group layer-3 (MP3) player.

Throughout this specification and the claims that follow, when it is described that an element is "connected" or "coupled" to another element, it should be understood that the element may be directly connected or coupled to the other element or electrically coupled to the other element through a third element. In contrast, when it is described that an element is "directly connected" or "directly coupled" to another element, it should be understood that there is no intermediate part between the two parts.

The electronic device may record media data or may reproduce previously stored media data, display reproduction information of reproducing media data on a touch screen thereof, select a random position of reproduction information displayed on the touch screen with a touch operation, and thus change a reproduction position of reproducing media data.

The electronic device may select a portion of media data to be stored in an operation of reproducing media data and perform a bookmark of information about a selected portion of media data. By providing the bookmark information together with the media data, when reproducing the media data, the electronic device can easily search for a position wanting to reproduce.

According to various embodiments, the method may include detecting occurrence of a search event while recording or reproducing the media data; generating a bookmark event to correspond to occurrence of the search event; and detecting occurrence of the bookmark event. According to an embodiment, generating a bookmark event may include detecting occurrence of the bookmark event.

According to various embodiments, the method may include displaying at least one of the acquired text information and a bookmark according to occurrence of the bookmark event.

According to various embodiments, detecting the occurrence of a bookmark event may include generating a search event while recording or reproducing the media data.

According to various embodiments, the search event may be to acquire text information corresponding to the bookmark segment from text data synchronized with the media data.

According to various embodiments, the bookmark segment may be determined as one of a predetermined time range starting from a reference point and a predetermined time range that sets the reference point to an end point according to acquired text information after performing a search function in text data synchronized with the media data.

According to various embodiments, the method may further include displaying the acquired text information.

According to various embodiments, the bookmark segment may be determined as one of a predetermined time range starting from a reference point thereof and a predetermined time range that sets the reference point to an end point in the media data.

According to various embodiments, the bookmark segment may be determined as one of words in the predetermined number starting from a reference point thereof and words in the predetermined number that set the reference point to an end point in the media data.

According to various embodiments, the bookmark segment may be determined as a predetermined range according to whether recording or reproducing the media data.

According to various embodiments, the bookmark segment may be determined as one of a predetermined time range starting from a reference point and a predetermined time range that sets the reference point to an end point in time information corresponding to text information acquired by performing a search function in text information synchronized with the media data.

According to various embodiments, the text information may be acquired from text information synchronized with voice information of the media data. According to an embodiment, the synchronized text information may be acquired from information stored at the electronic device or information connected by network communication.

According to various embodiments, the bookmark segment or the text information may be stored at one of a header and a text of the media data. According to an embodiment, at least one of time information about a reference point of the at least one bookmark segment and the text information corresponding to the time information may be together displayed. According to an embodiment, when the time information of the at least one of time information is selected, the media data of the bookmark segment corresponding to the time information may be reproduced. According to an embodiment, the time information may represent a recording elapsed time or a reproduction elapsed time of the media data.

According to various embodiments, the text information may represent the entire or a portion of the acquired text information.

According to various embodiments, the method may further include editing or deleting the text information.

The processor may control to detect occurrence of a search event while recording or reproducing the media data; to occur a bookmark event to correspond to occurrence of the search event; to determine a bookmark segment of the media data corresponding to occurrence of the bookmark event; and to acquire text information corresponding to voice information of the bookmark segment. According to an embodiment, occurrence of the bookmark event may include detection of occurrence of the bookmark event.

According to various embodiments, the processor may control to display at least one of the acquired text information and a bookmark according to occurrence of the bookmark event.

According to various embodiments, the processor may control to generate a search event while recording or reproducing the media data.

According to various embodiments, the processor may control the search event to acquire text information corresponding to the bookmark segment in text data synchronized with the media data.

According to various embodiments, the processor may control to perform a search function in text data synchronized with the media data and to determine a predetermined time range starting from a reference point or a predetermined time range that sets the reference point to an end point, as the bookmark segment, according to acquired text information.

According to various embodiments, the processor may control to display the acquired text information.

According to various embodiments, the processor may control to determine a predetermined time range starting from a reference point of the bookmark segment or a predetermined time range that sets the reference point to an end point, as the bookmark segment, in the media data.

According to various embodiments, the processor may control to determine words in the predetermined number starting from a reference point of the bookmark segment or words in the predetermined number that set the reference point to an end point, as the bookmark segment, in the media data.

According to various embodiments, the processor may control to determine, as the bookmark segment, a predetermined range according to whether the media data is recording or reproducing.

According to various embodiments, the processor may control to determine a predetermined time range starting from a bookmark reference point or a predetermined time range that sets the reference point to an end point, as the bookmark segment, in time information corresponding to text information acquired by performing a search function in text information synchronized with the media data.

According to various embodiments, the processor may control to acquire the text information from text information synchronized with voice information of the media data. According to an embodiment, the processor may control to acquire the synchronized text information from information stored at the electronic device or information connected by network communication.

According to various embodiments, the processor may control to store the bookmark segment or the text information at one of a header and a text of the media data.

According to various embodiments, the processor may control to together display at least one of time information of a reference point of the at least one bookmark segment and the text information corresponding to the time information. According to an embodiment, when a selection event of the time information of the at least one of time information is detected, the processor may control to reproduce the media data of the bookmark segment corresponding to the time information. According to an embodiment, the processor may control to determine a recording elapsed time or a reproduction elapsed time of the media data to the time information.

According to various embodiments, the processor may control to display the entire or a portion of the acquired text information as the text information.

According to various embodiments, the processor may control to edit or delete the text information.

Figure 1:
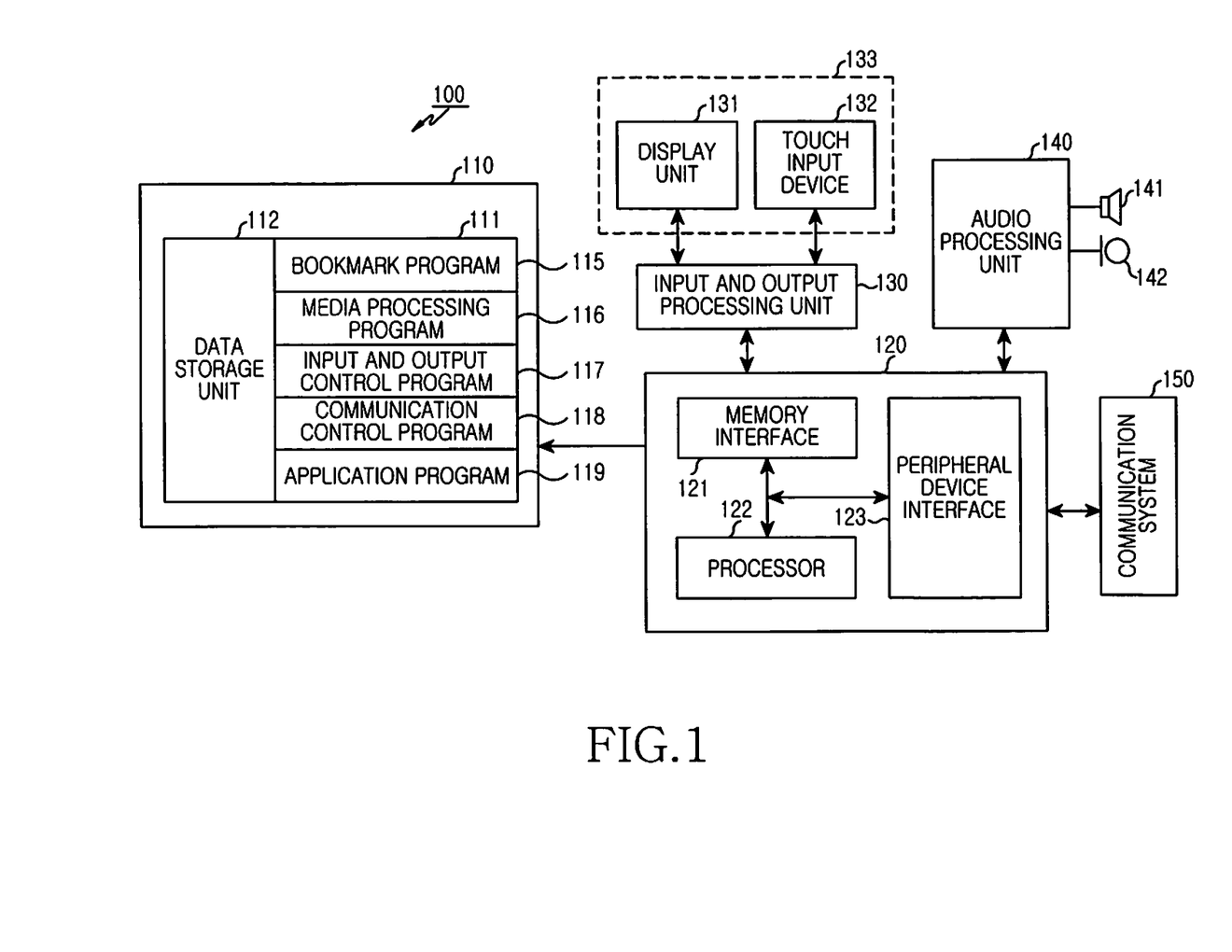
FIG. 1 is a block diagram illustrating a configuration of an electronic device according to an embodiment of the present invention.

FIG. 1 is a block diagram illustrating a configuration of an electronic device according to an embodiment of the present invention.

As shown in FIG. 1, the electronic device 100 includes a memory 110 and a processor unit 120, and may further include an input and output processor 130, a display unit 131, a touch input device 132, an audio processing unit 140, a communication system 150, and other peripheral devices.

The memory 110 includes a program storage unit 111 that stores a program for controlling operation of the electronic device 100, and a data storage unit 112 that stores data generated while performing a program, and may store data generated at a program with operation of a processor 122. According to an embodiment, the data storage unit 112 may previously determine operation information that can control a function of the electronic device 100 and form and store a database of a table or list form.

The program storage unit 111 includes a bookmark program 115, a media processing program 116, an input and output control program 117, a communication control program 118, and at least one application program 119. Programs included in the program storage unit 111 are formed with a set of instructions to be represented with an instruction set. The application program 119 may include a software element of at least one application program installed in the memory 110 of the electronic device 100.

The bookmark program 115 generates a bookmark at a random time domain in a process of recording or reproducing media data in the electronic device 100. According to an embodiment, the electronic device 100 performs a bookmark function while recording or reproducing media data through a recording program connected to the bookmark program 115 or the media processing program 116. The bookmark program 115 displays a time point in which a bookmark function is performed in recording or reproducing state information of media data.

In a process of recording or reproducing media data in the electronic device 100, when a bookmark function is performed, the bookmark program 115 acquires text data of voice information corresponding to a predetermined segment at a time point in which a bookmark is performed. According to an embodiment, the electronic device 100 performs a bookmark function while recording or reproducing media data through a recording program. The bookmark program 115 acquires voice information corresponding to a predetermined segment based on a time point in which a bookmark function is performed in media data and to acquire a digital text corresponding to the voice information.

The bookmark program 115 displays bookmark information included in media data and digital text information included in a bookmark. Further, in a process of reproducing media data, when a reproducing state arrives at a time point in which a bookmark is displayed (time point that performs a bookmark function), the bookmark program 115 displays digital text information included in a bookmark.

The bookmark program 115 stores bookmark information and digital text data generated in a process of performing a bookmark function while recording or reproducing media data in a predetermined area of media data. According to an embodiment, the electronic device 100 stores bookmark information and digital text data generated in a process of performing a bookmark function at a header or a text of media data.

The media processing program 116 inputs internal sound and/or external sound of the electronic device 100 through a microphone 142 and generates or reproduces audio data including the input external sound.

The input and output control program 117 inputs internal sound and/or external sound of the electronic device 100 in a process of recording media data through the media processing program 116. The input and output control program 117 detects a bookmark event executed in the electronic device 100, determines a time that detects a bookmark event through the bookmark program 115, and acquires voice information corresponding to a predetermined segment based on the determined time.

The communication control program 118 includes at least one software element for controlling communication with at least one another electronic device using the communication system 150 or a short range wireless communication module. According to an embodiment, the communication control program 118 searches for another electronic device for connecting communication. When another electronic device for communication connection is found, the communication control program 118 sets a connection for communication with another electronic device. Thereafter, by performing a performance search and session setting procedure with the connected another electronic device, the communication control program 118 transmits and receives data (e.g., packet data) to and from another electronic device through the communication system 150.

At least one memory 110 is included in the electronic device 100. According to an embodiment, the memory 110 may perform a function of only the program storage unit 111, perform a function of only the data storage unit 112, and perform both functions thereof according to use. In the memory 110, a physical area within the memory 110 may not clearly be divided in view of a characteristic of an electronic device.

The processor unit 120 includes a memory interface 121, at least one processor 122, and a peripheral device interface 123. Here, the memory interface 121, the at least one processor 122, and the peripheral device interface 123 included in the processor unit 120 may be integrated in at least one circuit or may be implemented with a separate constituent element.

The memory interface 121 controls access to the memory 110 of a constituent element such as the processor 122 or the peripheral device interface 123.

The peripheral device interface 123 controls a connection of an input and output peripheral device, the processor 122, and the memory interface 121 of the electronic device 100.

The processor 122 controls the electronic device 100 to provide various multimedia services using at least one software program and to display to determine an User Interface (UI) operation of the electronic device 100 to the display unit 131 through the input and output processor 130, and controls the touch input device 132 to provide a service that receives an input of an instruction from the outside of the electronic device 100. By executing at least one program stored at the memory 110, the processor 122 controls to provide a service corresponding to the program.

The input and output processor 130 provides an interface between the peripheral device interface 123 and an input and output device 133 such as the display unit 131 and the touch input device 132.

The display unit 131 receives and displays state information of the electronic device 100 and a character, a moving picture, or a still picture input from the outside from the processor unit 120.

The touch input device 132 provides input data generated by a user's selection to the processor unit 120 through the input and output processor 130. According to an embodiment, in order to receive data for the control from the outside of the electronic device 100, the touch input device 132 may be formed with only a control button or may be formed with a keypad.

According to an embodiment, in order to operate an input and an output on one screen, the touch input device 132 may be provided as the input and output device 133 together with the display unit 131. In such a case, the touch input device 132 used for the input and output device 133 may use at least one of a capacitive type, a resistive (pressure detection) type, an infrared ray type, an electromagnetic induction type, and an ultrasonic wave type.

According to an embodiment, an input method of the touch input device 132 may be a method of inputting an instruction when an input means is located within a predetermined distance from the touch screen 133, in addition to a method of directly touching and inputting the touch screen 133, and may be referred to as a hovering touch, a floating touch, an indirect touch, a proximity touch, or a non-contact input.

The input and output device 133 is a device that is physically coupled to the touch input device 132 as one screen on the display unit 131. When operating the electronic device 100, the input and output device 133 may be a touch screen that can allow a user to input an instruction by touching a screen configuration displayed in the display unit 131. The touch screen can perform both functions of the display unit 131 that displays an UI operation of the electronic device 100 and the touch input device 132 that inputs an external instruction to the electronic device 100. In the following description, the touch screen is formed as the touch screen 133 including the display unit 131 and the touch input device 132. Hereinafter, the touch screen 133 formed in a complex touch panel in which a touch panel and a pen touch panel are together formed is illustrated. The touch screen 133 of the electronic device 100 is not limited to a touch screen formed with a complex touch panel and may be applied even to a touch screen to which a pen touch panel that can perform only a pen touch is applied.

The audio processing unit 140 provides an audio interface between a user and the electronic device 100 through a speaker 141 and a microphone 142.

The communication system 150 performs a communication function. According to an embodiment, the communication system 150 may perform communication with another electronic device using at least one of mobile communication, wire communication, and satellite communication through a base station, and may be connected to a short range wireless communication module to perform short range wireless communication.

According to an embodiment, a short range wireless communication module performs communication with another electronic device using at least one of short range wireless communication such as infrared ray communication, Bluetooth communication, Bluetooth Low Energy (BLE) communication, Wi-Fi communication, Near Field Communication (NFC) wireless communication, Zigbee communication, and Ultra WideBand (UWB) communication, wireless Local Area Network (LAN) communication, and wire communication. According to an embodiment, it is described that the communication system 150 and a short range wireless communication module are divided, but the communication system 150 and the short range wireless communication module may perform communication in a communication system module. When describing various embodiments of the present invention, it may be described that an infrared ray communication module and a short range wireless communication module are divided.

Although not shown, at least one program or at least one element of the electronic device 100 performs operations by at least one control module which the processor 122 controls.

When describing an embodiment of the present invention, a display in the electronic device 100 or an output to the electronic device 100 may represent a method of displaying a moving picture, a still picture, or an Graphical User Interface (GUI) operation on the touch screen 133 of the electronic device 100, or outputting audio of a signal sound or a voice to the speaker 141. In the following description, a display or an output may be used as a same meaning, and when it is necessary to distinguish a display or an output, the display or the output may be separately described.

Figure 2A:
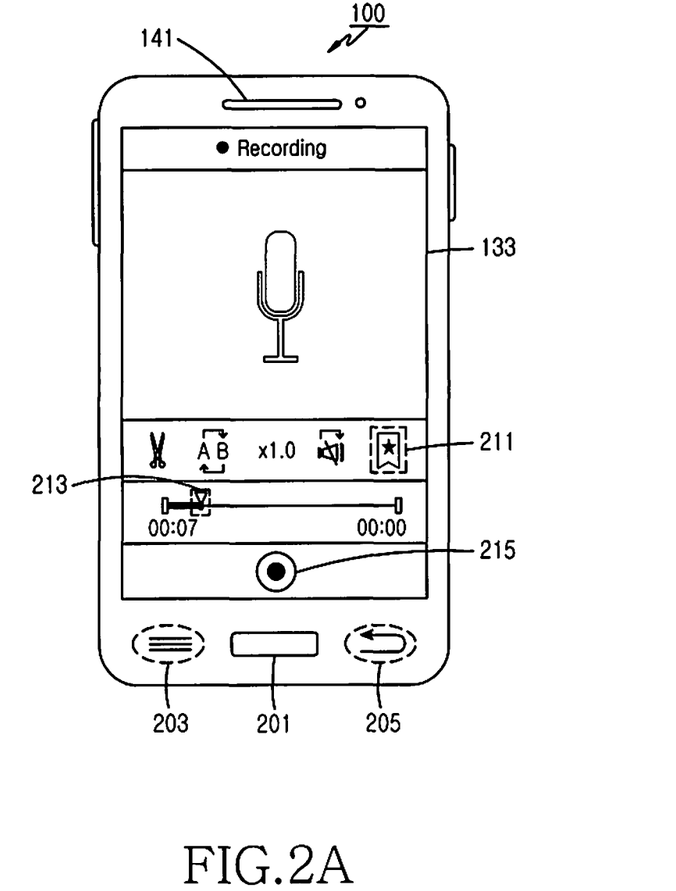
FIGS. 2A and 2B are diagrams illustrating a bookmark operation while performing a recording operation in an electronic device according to an embodiment of the present invention.
Figure 2B:
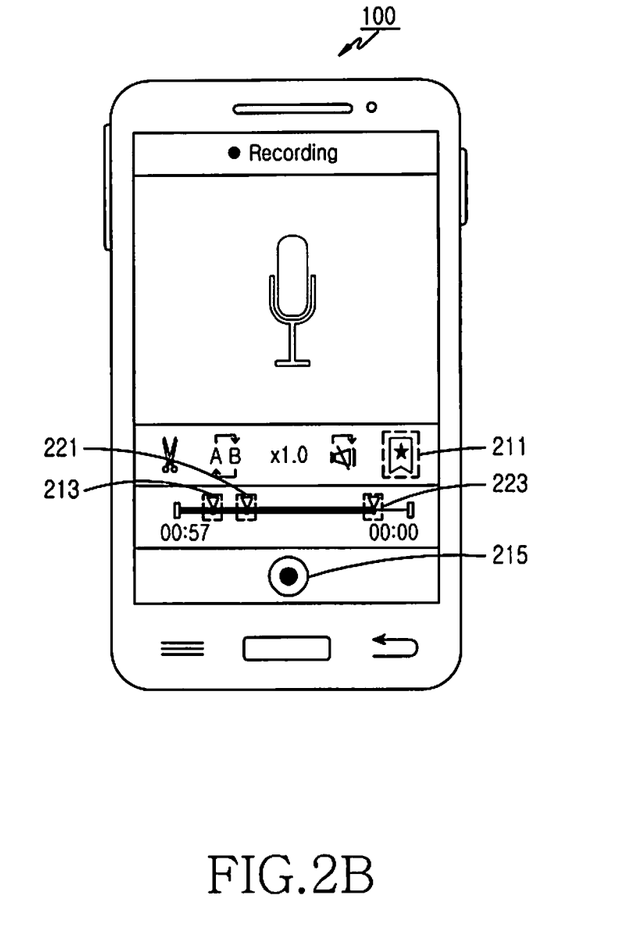

FIGS. 2A and 2B are diagrams illustrating a bookmark operation while performing a recording operation in an electronic device according to an embodiment of the present invention.

Referring to FIG. 2A, the electronic device 100 includes a speaker 141, that can output a sound, at an upper portion thereof, a button 201, which is one of input devices that can input an instruction by a click touch, at a lower portion thereof, and a touch button 203 or 205, that can input an instruction through a touch, at a fixed position. Although not shown, at least one microphone 142 that can input an external sound of the electronic device 100 may be disposed at a position exposed to the outside of the electronic device 100 to input sound. The electronic device 100 also includes a display unit 131 or a touch screen 133 in a front surface portion and displays a user interface (UI) operation thereof through the display unit 131 or the touch screen 133. The electronic device 100 may input an instruction through an operation of touching the touch screen 133 and perform a function or operation of the electronic device 100 corresponding to the input instruction. Hereinafter, it is described that the electronic device 100 includes the touch screen 133. The electronic device 100 may include the speaker 141, the button 201 or the touch button 203 or 205, and the touch screen 133 at the same position as described above or at a position different from that of the above description.

According to various embodiments, the electronic device 100 may mark a corresponding time by performing a predetermined bookmark function while performing a recording function and perform operation corresponding to a bookmark function.

According to an embodiment, the electronic device 100 generates audio data with the media processing program 116. The media processing program 116 inputs an internal sound and/or external sound of the electronic device 100 through the microphone 142 and processes to generate audio data including the input external sound. The electronic device 100 displays an UI to perform a recording function on the touch screen 133. The electronic device 100 displays a recording icon 215 that controls to perform a recording function, and when the recording icon 215 is selected, the electronic device 100 inputs an internal sound and/or external sound thereof to correspond to a lapse of a time through the microphone 142. By performing a bookmark function while performing a recording function on the touch screen 133, the electronic device 100 displays a bookmark generation icon 211 that controls to mark a time in which a bookmark function is performed. According to an embodiment, when the electronic device 100 selects the bookmark generation icon 211 at [00:07] second while operating a recording function, the electronic device 100 displays a bookmark state 213 representing that a bookmark operation was performed at a time corresponding to [00:07] second of a recording state display window. When a bookmark is generated, the electronic device 100 stores information of the bookmark and displays a bookmark state at a recording time.

According to an embodiment, when the electronic device 100 selects the bookmark generation icon 211, the electronic device 100 stores information about a displayed bookmark state and a corresponding recording time at a header or a text of recorded audio data. When the electronic device 100 stores information about a bookmark at audio data, the electronic device 100 stores information about the bookmark by allocating a storage area of a predetermined size for the bookmark and determines a size of a storage area that stores bookmark information according to a magnitude of bookmark information when generating the bookmark.

According to various embodiments, the electronic device 100 may display a bookmark state at a corresponding recording time through operation of selecting the bookmark generation icon 211 while performing a recording function. The electronic device 100 displays at least one bookmark state in recording audio data by selecting the bookmark generation icon 211.

According to an embodiment, by performing again an operation of selecting the bookmark generation icon 211 after operation of selecting the bookmark generation icon 211, the electronic device 100 repeatedly performs a bookmark operation. By selecting the bookmark generation icon 211 at [00:07] second, as described with reference to FIG. 2A while operating a recording function, the electronic device 100 displays the bookmark state 213 and stores bookmark information of a time corresponding to a bookmark state. According to an embodiment, the electronic device 100 selects again the bookmark generation icon 211 after displaying the bookmark state 213, stores a recording time and bookmark information of a time point that selects the bookmark generation icon 211 while performing a recording function, and displays a bookmark state 221 at a time (bookmark time) that selects the bookmark generation icon 211 of a recording state display window. According to an embodiment, the electronic device 100 stores a bookmark state display and information about a bookmark of a recording time of audio data while recording through a bookmark operation that selects the bookmark generation icon 211, and repeatedly performs operation of a bookmark function by repeatedly selecting the bookmark generation icon 211. According to an embodiment, by selecting the bookmark generation icon 211 at a recording time corresponding to [00:57] second of recording audio data, the electronic device 100 stores information in which a bookmark is performed at [00:57] second of a recording state display window and displays a bookmark state 223. By selecting a recording icon 215 while operating a recording function, the electronic device 100 may pause a recording operation of recording audio data according to a function thereof, or may terminate a recording operation. Alternatively, the electronic device 100 may provide a separate recording end icon instead of the recording icon 215, and when the electronic device 100 selects a recording end icon, the electronic device 100 terminates a recording operation. When the electronic device 100 terminates a recording operation, the electronic device 100 may store recorded audio data. Alternatively, the electronic device 100 may transmit recorded audio data to another electronic device.

Figure 3:
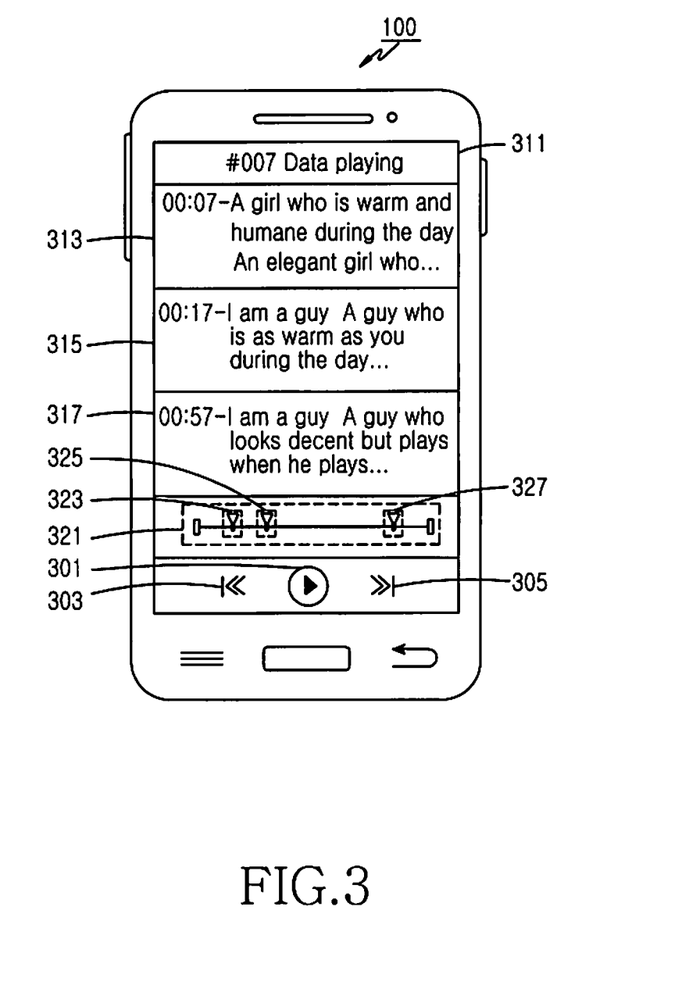
FIG. 3 is a diagram illustrating operation of a bookmark function in an electronic device according to an embodiment of the present invention.

FIG. 3 is a diagram illustrating an operation of a bookmark function in an electronic device according to an embodiment of the present invention.

According to various embodiments, when the electronic device 100 operates a bookmark function, the electronic device 100 may determine voice information corresponding to a predetermined time or a predetermined word from a bookmark time point of recorded audio data and acquire text information corresponding to voice information. The electronic device 100 may display the acquired text information as information of each bookmark.

According to an embodiment, referring back to FIG. 2A or 2B, when the electronic device 100 performs a bookmark by selecting the bookmark generation icon 211 while recording audio data, the electronic device 100 determines voice information corresponding to a predetermined time or a predetermined word from a bookmark time, acquires text information corresponding to the voice information, and stores the text information together with bookmark information at a header or at a predetermined area of a text.

According to an embodiment, the electronic device 100 sets to acquire voice information of 20 words from a bookmark time as text information. When a bookmark is performed at [00:07] second, the electronic device 100 determines 20 words from [00:07] second of voice information included in recorded audio data, acquires the determined 20 words as text information, and displays a portion or the entire of the acquired text information as bookmark information 313 in an area displayed as a bookmark area of recorded audio data. According to an embodiment, when a bookmark is performed at [00:17] second, the electronic device 100 determines 20 words from [00:17] seconds of voice information included in recorded audio data, acquires the determined 20 words as text information, and displays a portion or the entire of the acquired text information as bookmark information 315 in an area displayed as a bookmark area of recorded audio data. According to an embodiment, when a bookmark is performed at [00:57] second, the electronic device 100 determines 20 words from [00:57] seconds of voice information included in recorded audio data, acquires the determined 20 words as text information, and displays a portion or the entire of the acquired text information as bookmark information 317 in an area displayed as a bookmark area of recorded audio data.

The electronic device 100 displays a bookmark state of bookmark times [00:07] second, [00:17] second, and [00:57] second into a bookmark state 323 corresponding to bookmark information of [00:07] second, a bookmark state 325 corresponding to bookmark information of [00:17] second, and a bookmark state 327 corresponding to bookmark information of [00:57] second, respectively, at a corresponding time position of an audio data state information window 321. According to an embodiment, the electronic device 100 reproduces recorded audio data by selecting a reproduction icon 301, and when a reproducing time corresponds with a bookmark time while reproducing audio data, the electronic device 100 displays a predetermined visual effect in text information displayed to correspond to a bookmark function of a corresponding time. According to an embodiment, while the electronic device 100 reproduces audio data, when a backward icon 303 is selected, the electronic device 100 reproduces the audio data from an immediately preceding bookmark of a reproduction time point; and while the electronic device 100 reproduces audio data, when a forward icon 305 is selected, the electronic device 100 reproduces the audio data from a reproduction time point to an immediately after bookmark.

According to various embodiments, in a method of acquiring voice information corresponding to a bookmark segment as text information, the electronic device 100 may acquire text information through operation of converting voice information to text information, and when text data corresponding to voice information of audio data exists, the electronic device 100 may acquire text information corresponding to voice information from the text data. According to an embodiment, the electronic device 100 acquires text data synchronized with audio data and acquires text information corresponding to voice information through the acquired text data. According to an embodiment, the electronic device 100 acquires text data synchronized with audio data from another electronic device or a server device connected by network communication and acquires text information corresponding to voice information through the acquired text data.

Figure 4A:
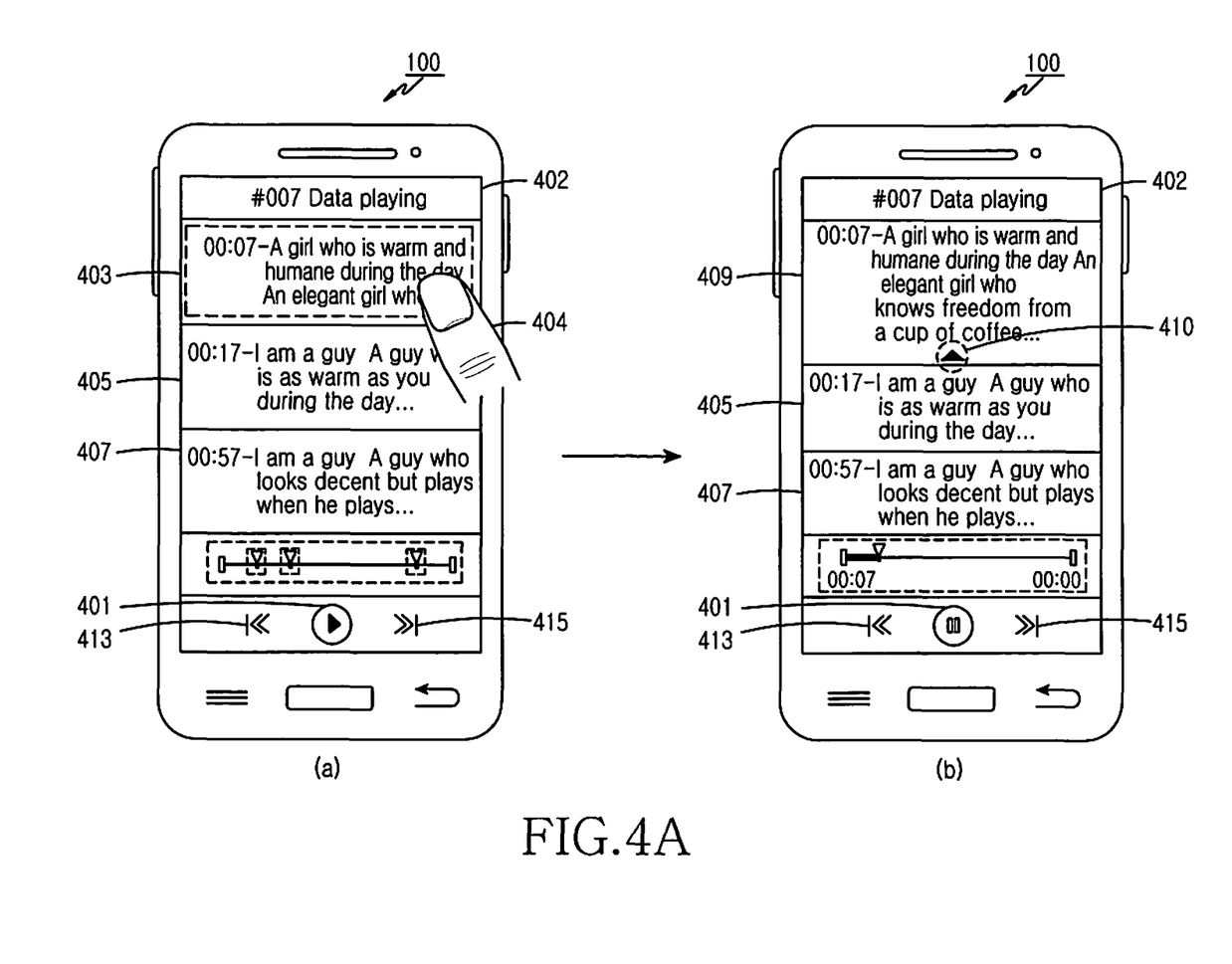
FIGS. 4A to 4C are diagrams illustrating operation of a bookmark function in an electronic device according to an embodiment of the present invention.
Figure 4B:
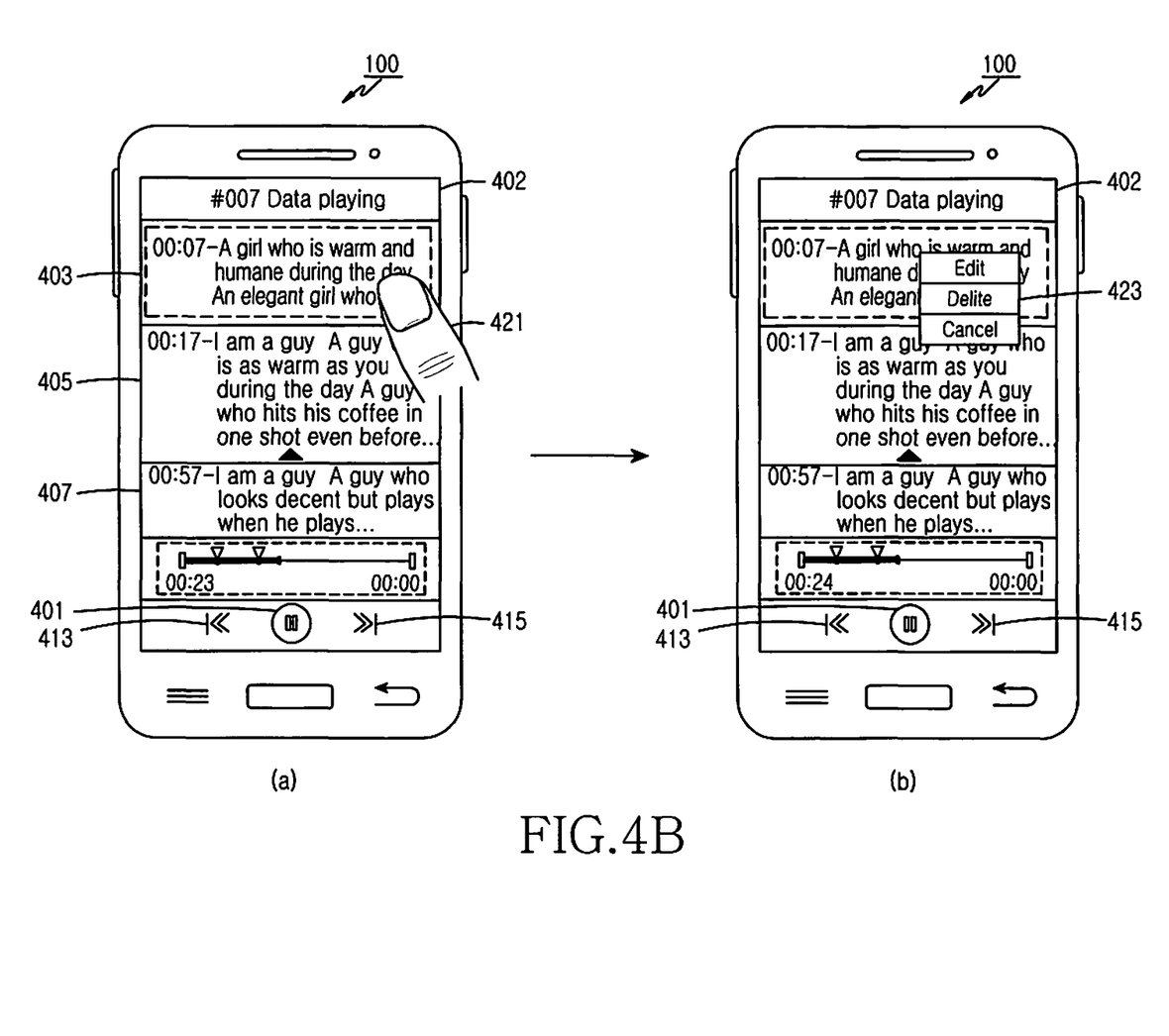
Figure 4C:
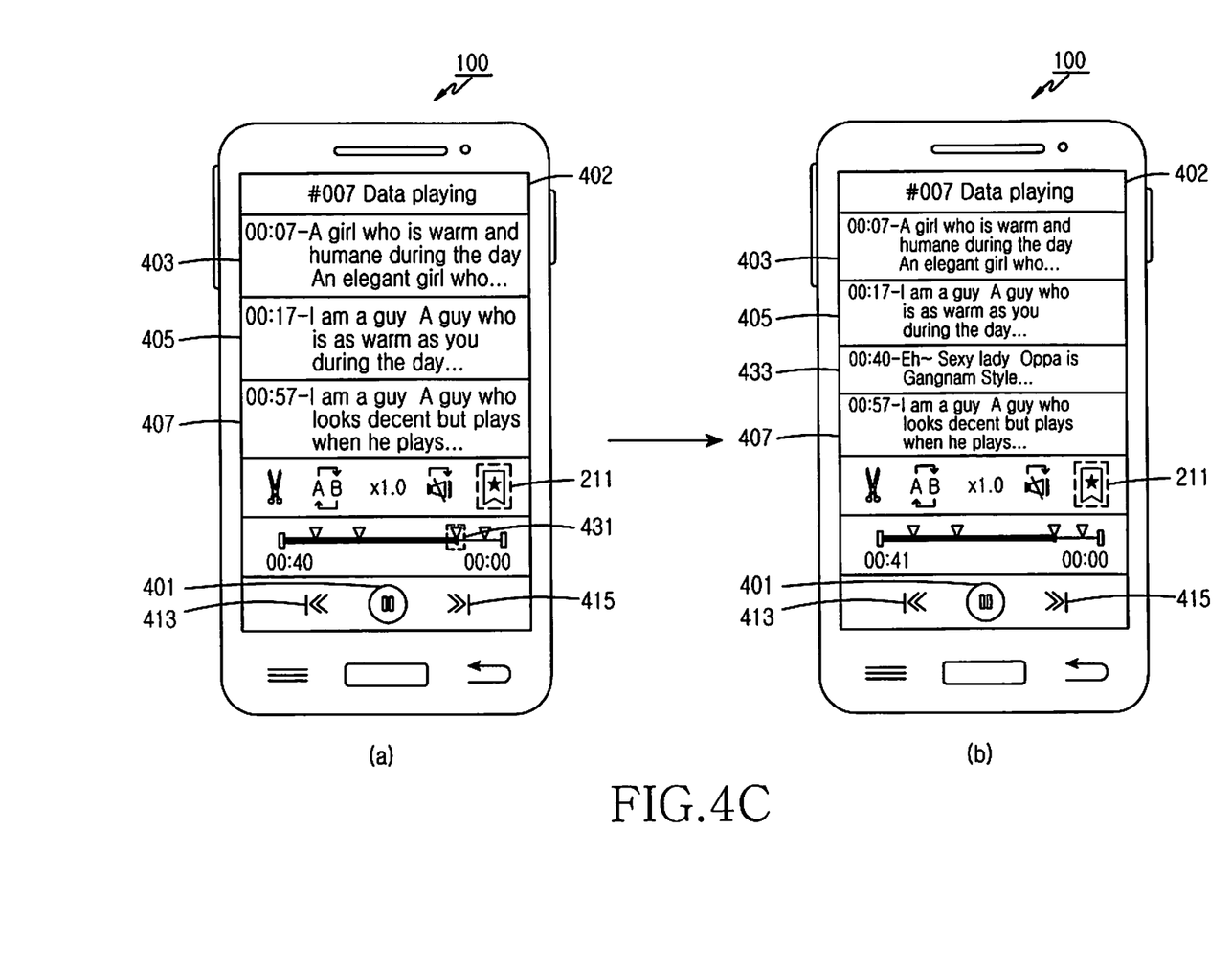

FIGS. 4A to 4C are diagrams illustrating an operation of a bookmark function in an electronic device according to an embodiment of the present invention.

According to various embodiments, the electronic device 100 may display bookmark information of recorded audio data, select the displayed bookmark information, and reproduce a segment corresponding to bookmark information selected from the recorded audio data.

Referring to FIG. 4A(a), when a bookmark is selected from bookmark information of recorded audio data displayed on the touch screen 133, the electronic device 100 reproduces a segment corresponding to the selected bookmark information of the recorded audio data. According to an embodiment, the electronic device 100 selects information 403 in which a bookmark is performed at [00:07] second from the bookmark information 402 of recorded audio data #007. The electronic device 100 reproduces a segment corresponding to a bookmark of selected [00:07] second of audio data #007. The segment corresponding to a bookmark of selected [00:07] second is a segment including voice information of 20 words starting from [00:07] second of audio data #007. According to an embodiment, the electronic device 100 selects information 405 in which a bookmark is performed at [00:17] second from bookmark information 402 of recorded audio data #007. The electronic device 100 reproduces a segment corresponding to a bookmark of selected [00:17] second of audio data #007. The segment corresponding to a bookmark of selected [00:17] second is a segment including voice information of 20 words starting from [00:17] second of audio data #007. According to an embodiment, the electronic device 100 selects information 407 in which a bookmark is performed at [00:57] second from the bookmark information 402 of recorded audio data #007. The electronic device 100 reproduces a segment corresponding to a bookmark of [00:57] second selected from audio data #007. The segment corresponding to a bookmark of selected [00:57] second is a segment including voice information of 20 words starting from [00:57] second of audio data #007.

According to various embodiments, a segment corresponding to a bookmark determined in the electronic device 100 is not limited to a segment including voice information of 20 words from a start position. The electronic device 100 may determine segment information corresponding to a bookmark according to preset segment information in a bookmark process. According to an embodiment, the electronic device 100 previously determines the word number of voice information to acquire as text information, such as 5 words, 10 words, 15 words, and the like, from a bookmark time point. According to an embodiment, the electronic device 100 previously determines a recording time or a reproduction time of a segment including voice information to acquire as text information, such as 5 seconds, 10 seconds, 15 seconds, and the like, from a bookmark time point.

According to various embodiments, when the electronic device 100 determines a segment of audio data corresponding to a bookmark, the electronic device 100 does not limit a segment of audio data to a segment starting from a bookmark time point, such as a predetermined time from a bookmark time point, or a predetermined word from a bookmark time point. According to an embodiment, the electronic device 100 sets a bookmark time point to an end point and determines 20 seconds preceding the bookmark time point as a segment corresponding to a bookmark, and the electronic device 100 sets a bookmark time point to an end point and acquires voice information included in a segment of 20 seconds preceding the bookmark time point as text information. According to an embodiment, the electronic device 100 sets a bookmark time point to an end point and determine 20 words preceding the bookmark time point as a segment corresponding to a bookmark, and the electronic device 100 sets a bookmark time point to an end point and acquires voice information of 20 words preceding the bookmark time point as text information. The electronic device 100 may determine and provide a segment of audio data corresponding to a bookmark through setting.

According to various embodiments, a segment corresponding to a bookmark determined in the electronic device 100 is not limited to a segment that sets a bookmark time point to an end point and that includes voice information of 20 seconds or 20 words preceding the bookmark time point. The electronic device 100 may determine segment information corresponding to a bookmark according to preset segment information in a bookmark process. According to an embodiment, the electronic device 100 sets a bookmark time point to an end point and previously determine the word number of voice information to be acquired as text information, such as 5 words, 10 words, and 15 words. According to an embodiment, the electronic device 100 sets a bookmark time point to an end point and previously determine a recording time or a reproduction time of a segment including voice information to be acquired as text information, such as 5 seconds, 10 seconds, and 15 seconds.

Referring to FIG. 4A(b), when a bookmark is selected from bookmark information of recorded audio data displayed on the touch screen 133, the electronic device 100 displays text information acquired at a segment corresponding to the selected bookmark information. According to an embodiment, the electronic device 100 selects information 403 as illustrated in FIG. 4A(a) in which a bookmark is performed at [00:07] second from bookmark information 402 of recorded audio data #007. When the electronic device 100 displays partial text information allowed in a display area among text information acquired from a segment corresponding to a bookmark of selected [00:07] second in audio data #007, the electronic device 100 extends a display area 409 and displays the entire of text information acquired at a bookmark segment of [00:07] second. The entire of text information acquired at a segment corresponding to a bookmark of selected [00:07] second is text data that converts voice information of 20 words starting from [00:07] second of audio data #007 to text information.

According to an embodiment, the electronic device 100 determines the extended display area 409 to an area that can display the entire of acquired text data, or may reset a size of the area and display a text to an area extended to an area of a predetermined size. According to an embodiment, when the electronic device 100 extends an area in which text information is displayed by selecting an area 403 as illustrated in FIG. 4A(a) that displays a portion of text information acquired at a bookmark segment of [00:07] second, the electronic device 100 extends a display area downward, as shown in the area 409, and extends a display area to display the entire of 20 words acquired at a bookmark segment of [00:07] second. According to an embodiment, when a triangular icon 410 displayed in an extended display area is selected, the electronic device 100 restores the area 403 as illustrated in FIG. 4A(a) that displays a portion of text information acquired at a bookmark segment of [00:07] second.

According to various embodiments, when the electronic device 100 displays an extended display area that displays the acquired text information on the touch screen 133, the display method is not limited to an existing method of extending the display area 409 of bookmark information displayed on the touch screen 133, the electronic device 100 may display an extended display area through a predetermined area of the touch screen 133 or a window popped up in a new layer.

According to an embodiment, when the electronic device 100 selects information 403 as illustrated in FIG. 4A(a) in which a bookmark is performed at [00:07] second from bookmark information 402 of recorded audio data #007, the electronic device 100 may display the entire of text information acquired at a bookmark segment of [00:07] second in the extended display area 409 and perform operation of reproducing a segment corresponding to the information 403 as illustrated in FIG. 4A(a) in which a bookmark is performed at selected [00:07] second. According to an embodiment, the electronic device 100 selects information 405 as illustrated in FIG. 4A(a) in which a bookmark is performed at [00:17] second from bookmark information of recorded audio data #007. The electronic device 100 extends a text display area of selected [00:17] second and displays the entire of text information acquired at a bookmark segment of [00:17] second in an extended text display area. The electronic device 100 reproduces a bookmark segment of selected [00:17] second in audio data #007 together with operation of displaying entire data acquired at a bookmark segment of the selected [00:17] second in an extended text display area.

According to various embodiments, the electronic device 100 may provide a menu that can edit or a menu that can delete text information acquired at a bookmark segment.

Referring to FIG. 4B(a), the electronic device 100 selects one bookmark information from bookmark information of displayed audio data through a predetermined gesture. The electronic device 100 provides a menu that can edit bookmark information selected through a predetermined gesture or a menu that can delete information of a selected bookmark. According to an embodiment, a predetermined gesture is a gesture that maintains a touch for a predetermined time or more, and the electronic device 100 may perform a predetermined gesture in an area that displays the information 403 in which a bookmark is performed at [00:07] second among the bookmark information 402 of audio data #007. The electronic device 100 may input a touch of a random position within an area that displays the information 403 in which a bookmark is performed at [00:07] second. The electronic device 100 may provide a menu that can edit text contents of the information 403 in which a bookmark is performed at [00:07] second, in an area in which a gesture is input, to correspond to an input gesture, or a menu that can delete the information 403 in which a bookmark is performed at [00:07] second.

According to various embodiments, when the electronic device 100 provides a menu that can edit or a menu that can delete bookmark information selected through a predetermined gesture, even while a segment corresponding to another bookmark information of the same audio data is reproducing, the electronic device 100 may provide a menu that edits or a menu that deletes bookmark information selected through a predetermined gesture. According to an embodiment, the electronic device 100 receives an input that selects information 405 in which a bookmark is performed at [00:17] second from the bookmark information 402 of audio data #007 displayed on the touch screen 133, and reproduces audio data #007 from [00:17] second according to the selected information. Further, the electronic device 100 may display acquired text information at a selected bookmark segment together with the operation of reproducing audio data #007 from [00:17] second in an extended display area. As described above, while the electronic device 100 performs an operation corresponding to a bookmark segment of [00:17] second, in order to change bookmark information of [00:07] second, the electronic device 100 performs a predetermined gesture that displays a menu that can edit bookmark information 403 in a random area. In order to edit bookmark information 403 while operating information of another bookmark segment, when the electronic device 100 performs a predetermined gesture that displays a menu that can edit bookmark information, the electronic device 100 provides a menu that can edit bookmark information 403 through a predetermined gesture in a predetermined area on the touch screen 133.

Referring to FIG. 4B(b), the electronic device 100 displays a menu that can edit or a menu that can delete provided bookmark information on the touch screen 133 by performing a predetermined gesture described with reference to FIG. 4B(a).

According to an embodiment, the electronic device 100 selects information in which a bookmark is performed at [00:07] second, and performs a predetermined gesture while displaying the bookmark information 402 of audio data #007. The electronic device 100 displays menus 423 including at least one of a menu that can edit the selected bookmark information in a predetermined area (which may be determined according to a predetermined method) adjacent to a position that performs a gesture, a menu that can delete the selected bookmark information, and a cancel menu that can release a display of a displayed menu.

According to various embodiments, when storing bookmark information in audio data, it is not limited to storing bookmark information by selecting the bookmark generation icon 211 while recording audio data, and the electronic device 100 may store bookmark information while reproducing recorded audio data.

Referring to FIG. 4C(a), the electronic device 100 generates new bookmark information at a selected time position through an operation of selecting the bookmark generation icon 211 while reproducing recorded audio data.

The electronic device 100 displays bookmark information of recorded audio data on the touch screen 133 and controls a text display of a bookmark segment in which audio data is reproduced or stored through a reproduction icon 401, a backward icon 413, or a forward icon 415 together displayed in a predetermined area on the touch screen 133.

According to various embodiments, the electronic device 100 may generate bookmark information at a time position at which the bookmark generation icon 211 of audio data is selected through an operation of selecting the bookmark generation icon 211 while reproducing a random segment of recorded audio data, and acquire text information corresponding to voice information of a generated bookmark information segment. According to an embodiment, the electronic device 100 selects the bookmark generation icon 211 at [00:40] second while reproducing 'audio data #007. The electronic device 100 generates and displays new bookmark information 431 at a time position of selected [00:40] second. The electronic device 100 acquires text information corresponding to voice information of 20 words according to predetermined setting from [00:40] second.

According to various embodiments, the electronic device 100 may differently set a method of determining a segment including voice information in a bookmark generated in recording audio data and a method of determining a segment including voice information in a bookmark generated in reproducing audio data. According to an embodiment, when the electronic device 100 selects the bookmark generation icon 211 while recording audio data, the electronic device 100 sets to acquire voice information corresponding to 20 words starting from the selected time position as text information. When the electronic device 100 selects the bookmark generation icon 211 while reproducing audio data, the electronic device 100 sets to acquire voice information included within 20 seconds starting from the selected time position as text information. According to preset information, the electronic device 100 may acquire text information of a determined bookmark segment according to another preset condition when generating bookmark information in an operation of recording audio data and when generating bookmark information in an operation of reproducing audio data.

Referring to FIG. 4C(b), the electronic device 100 displays information of a new bookmark generated through the bookmark generation icon 211 while reproducing audio data on the touch screen 133 that displays information of audio data.

According to various embodiments, the electronic device 100 may acquire voice information of a determined segment according to a predetermined method from a bookmark time point in reproduction information of audio data as text information. The electronic device 100 may together display the entire or a portion of the acquired text information in a display area that displays text information of a bookmark generated when recording audio data.

According to an embodiment, as described with reference to FIG. 4C(a), when a bookmark is performed at [00:40] second while reproducing audio data #007, the electronic device 100 determines a segment of audio data including bookmark information. When a bookmark is performed while reproducing predetermined audio data, the electronic device 100 sets to acquire voice information included within 20 seconds starting from a bookmark time position according to a segment setting method as text information. The electronic device 100 together displays text information 433 acquired from voice information included within 20 seconds starting from a bookmark time position in a display area that displays text information of another bookmark.

According to various embodiments, when the electronic device 100 displays bookmark information of recorded audio data, the electronic device 100 may display to visually distinguish a bookmark generated while reproducing audio data and/or a bookmark generated while recording audio data, and text information corresponding to a bookmark segment and/or text information corresponding to the bookmark.

Figure 5:
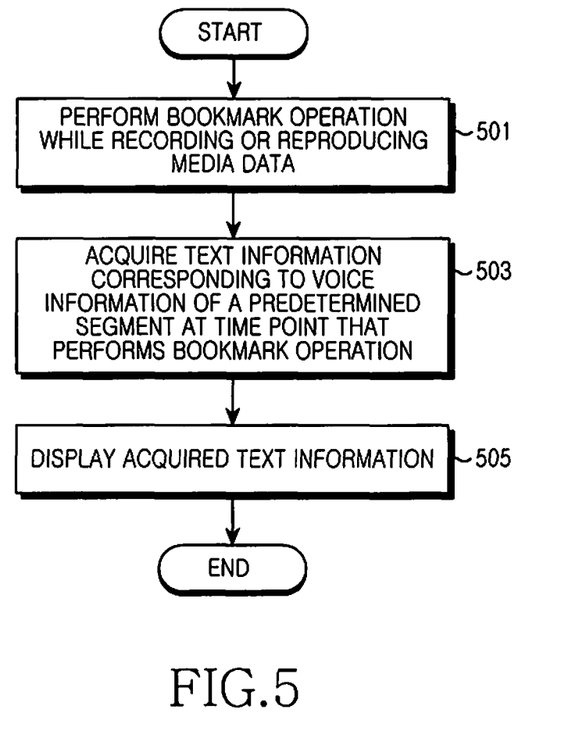
FIG. 5 is a flowchart illustrating operation of performing a bookmark function in an electronic device according to an embodiment of the present invention.

FIG. 5 is a flowchart illustrating an operation of a bookmark function in an electronic device according to an embodiment of the present invention.

According to various embodiments, the electronic device 100 may perform a bookmark function while performing a recording function or a reproduction function, acquire text information corresponding to voice information of a predetermined segment at a bookmark time point, and display the acquired text information in a bookmark information display area of corresponding audio data.

The electronic device 100 performs a bookmark operation while recording media data and generates bookmark information at a bookmark time in step 501. According to an embodiment, the electronic device 100 performs a bookmark operation by performing a predetermined method that can generate a bookmark event such as a bookmark generation icon while recording media data.

According to various embodiments, the electronic device 100 may perform a bookmark function while reproducing media data and generate bookmark information at a bookmark time. According to an embodiment, the electronic device 100 performs a bookmark function by performing a predetermined method that can generate a bookmark event such as generation of a bookmark generation icon while reproducing media data.

The electronic device 100 acquires text information from voice information included at a determined segment at a time point that performs a bookmark operation in step 503.

According to various embodiments, when the electronic device 100 detects that a bookmark event occurs, the electronic device 100 may determine time information of corresponding media data at a time point in which the event is detected, and determine a bookmark segment using the time information to a reference point. According to an embodiment, the electronic device 100 sets a reference point to a start point, and determines a bookmark segment as a predetermined time after a reference point or the number of predetermined words included in voice information after a reference point. According to an embodiment, the electronic device 100 sets a reference point to an end point, and determines a bookmark segment as a predetermined time before a reference point or the number of predetermined words included in voice information before a reference point.

When the electronic device 100 detects that a bookmark event occurs, the electronic device 100 may determine a bookmark segment according to a predetermined method and acquire text information based on voice information included in the bookmark segment. According to an embodiment, the electronic device 100 detects voice information included in a bookmark segment of media data, and acquires text information corresponding to the detected voice information.

According to an embodiment, the electronic device 100 converts voice information to text information through a speech-to-text conversion module or a speech-to-text conversion program with a method of acquiring text information corresponding to the detected voice information. The electronic device 100 includes a speech-to-text conversion module or a speech-to-text conversion program that can convert the detected voice information, and the processor 122 controls the speech-to-text conversion module or the speech-to-text conversion program. The electronic device 100 may independently include a speech-to-text conversion program in the memory 110 thereof, or may include a speech-to-text conversion program in a portion of at least one program such as the bookmark program 115 and the media processing program 116.

The electronic device 100 displays information of media data including a bookmark in step 505. The electronic device 100 may display the number of bookmarks in which media data includes, a bookmark position in record or reproduction time information of media data, and text information that is acquired in each bookmark event on the touch screen 133. When the electronic device 100 displays text information of each bookmark segment, the electronic device 100 displays the entire or a portion of text information included in a bookmark segment according to a predetermined method. When the electronic device 100 selects one of at least one displayed bookmark information, the electronic device 100 reproduces a segment corresponding to selected bookmark information of media data. When the electronic device 100 displays only a portion of text information corresponding to the selected bookmark, by extending a display area that displays text information corresponding to the selected bookmark or by generating a separate window, the electronic device 100 displays the entire of text information corresponding to the selected bookmark.

According to various embodiments, by performing a predetermined operation in at least one displayed bookmark information, the electronic device 100 may edit text information and delete bookmark information. According to an embodiment, the electronic device 100 touches one bookmark information in at least one bookmark information displayed on a touch screen, and maintains a touch for a predetermined time or more. The electronic device 100 displays a menu that can edit a text of a touched bookmark with a corresponding operation, a menu that can delete touched bookmark information and/or text data of a bookmark, and a menu that can set, edit, or delete a title of text information of a bookmark in a predetermined area or a separate window of the touch screen 133. When the electronic device 100 detects that one from the displayed menu is selected, the electronic device 100 performs an operation corresponding to the selected menu.

According to various embodiments, the electronic device 100 may independently perform the operation in step 505 at a random time point after performing operations in steps 501 to 503 instead of continuously performing operation in step 505 after performing the above-described operations in steps 501 to 503.

When the electronic device 100 performs the operation in step 505, the procedure of FIG. 5 is terminated.

According to various embodiments of the present invention, a user can easily and quickly search media data for a desired reproduction time point through bookmark information and use information generated with a bookmark event in media data with various methods.

According to various embodiments of the present invention, when the electronic device 100 performs operation of generating bookmark information and acquiring text data corresponding to a bookmark segment, the operation is not limited to a recording function of generating audio data or a reproduction function of audio data, and the same or similar bookmark function can be applied to a recording function of generating moving picture data or a reproduction function of moving picture data.

Various embodiments that describe the present invention may be performed through at least one program in which the memory 110 of the electronic device 100 includes, and may be directly controlled by a processor. Further, various embodiments may be controlled through at least one control module in which a processor controls.

Methods according to various embodiments described in claims and/or a specification of the present invention can be implemented in a form of hardware, software, or a combination thereof. When the methods are implemented with software, a computer readable storage medium that stores at least one program (software module) may be provided. At least one program stored at a computer readable storage medium may be formed to execute by at least one processor within the electronic device 100. At least one program may include an instruction that enables the electronic device 100 to execute methods according to various embodiments described in claims or a specification of the present invention.

Such a program (software module, software) may be stored at a non-volatile memory including a Random Access Memory (RAM) and a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of a portion or the entire thereof. Further, each constituent memory may be included in plural.

Further, the program may be stored at an attachable storage device that may access to the electronic device 100 through a communication network such as Internet, intranet, a Local Area Network (LAN), a Wireless LAN (WLAN), or a Storage Area Network (SAN), or a communication network formed with a combination thereof. Such a storage device can access to the electronic device 100 through an external port.

Further, a separate storage device on the communication network may access to a portable electronic device 100. While the present invention has been shown and described with reference to embodiments thereof, it will be understood by those skilled in the art that various changes in form and details may be made therein without departing from the spirit and scope of the present invention as defined by the appended claims and their equivalents.

What is claimed is:

1. A method in an electronic device, the method comprising: detecting an input for generating a bookmark while recording or reproducing a media data;
    determining a time interval of the media data within a total time when the media data is recorded or reproduced, based on a time when the input for generating the bookmark is detected;
    determining voice information corresponding to the determined time interval, the voice information being included in the media data;
    acquiring text information which the voice information corresponding to the time interval is converted into, and
    wherein the time interval starts or ends at the time when the input for generating the bookmark is detected; and
    wherein the time interval is determined according to a predetermined number of words to be included in the text information; and
    displaying the acquired text information with the generated bookmark.

2. The method of claim 1, wherein the time interval is determined according to whether recording or reproducing the media data.

3. The method of claim 1, wherein the time interval and the text information are stored at one of a header and a text of the media data.

4. The method of claim 1, wherein determining the time interval comprises determining one or more time intervals according to a number of the detection of the input.

5. The method of claim 4, further comprising reproducing, when one of the one or more time intervals is selected, a media data corresponding to the selected time interval.

6. The method of claim 1, wherein information of the bookmark includes information on a recording elapsed time or a reproduction elapsed time of the media data.

7. The method of claim 1, further comprising editing or deleting the text information.

8. An electronic device, comprising:
    a touch screen;
    a memory; and
    at least one processor operatively coupled to the touch screen, the at least one processor configured to:
    detect an input for generating occurrence of a bookmark event—while recording or reproducing a media data,
    determine a time interval of the media data within a total time when the media data is recorded or reproduced, based on a time when the input for generating the bookmark is detected;
    determine voice information corresponding to the determined time interval, the voice information being included in the media data;
    acquire text information which the voice information corresponding to the time interval is converted into, and
    wherein the time interval starts or ends at the time when the input for generating the bookmark is detected; and
    wherein the processor is further configured to determine the time interval according to a predetermined number of words to be included in the text information; and
    control the touch screen to display the acquired text information with the generated bookmark.

9. The electronic device of claim 8, wherein the processor is further configured to determine the time interval according to whether recording or reproducing the media data.

10. The electronic device of claim 8, wherein the processor is further configured to store the time interval and the text information at one of a header and a text of the media data.

11. The electronic device of claim 8, wherein the processor is further configured to determine one or more time intervals according to a number of the detection of the input.

12. The electronic device of claim 8, wherein the processor is further configured to reproduce, when one of the one or more time intervals is selected, a media data corresponding to the selected time interval.

13. The electronic device of claim 8, wherein information on the bookmark includes information on a recording elapsed time or a reproduction elapsed time of the media data to the time information.

14. The electronic device of claim 8, wherein the processor is configured to edit or delete the text information.

* * * * *